United States Patent [19]

Hughes

[11] Patent Number: 4,640,781
[45] Date of Patent: Feb. 3, 1987

[54] EXPANDABLE FIBROUS BED COALESCER

[75] Inventor: Victor B. Hughes, Chester, United Kingdom

[73] Assignee: Shell Oil Company, Houston, Tex.

[21] Appl. No.: 718,265

[22] Filed: Apr. 1, 1985

[30] Foreign Application Priority Data

Jul. 12, 1984 [GB] United Kingdom ............... 8417783

[51] Int. Cl.$^4$ .............................................. C02F 1/40
[52] U.S. Cl. ............................. 210/520; 210/DIG. 5
[58] Field of Search ............... 210/693, 799, 513, 260, 210/908, 924, 382, DIG. 5, 519, 520

[56] References Cited

U.S. PATENT DOCUMENTS 3,794,583 2/1974 Rhodes ..................... 210/DIG. 5
3,948,767 4/1976 Chapman ................... 210/DIG. 5
4,416,782 11/1983 Kerres .............................. 210/693

Primary Examiner—Ivars Cintins

[57] ABSTRACT

An apparatus for treating liquid, such as for coalescing and separating finely dispersed oil droplets from an oil/water emulsion, which includes a cluster of fibers arranged in a housing, wherein the cluster of fibers can be displaced stepwise into and from a neck portion of the housing, thereby providing in the neck portion a compressed fibrous bed with an adjustable thickness.

8 Claims, 1 Drawing Figure

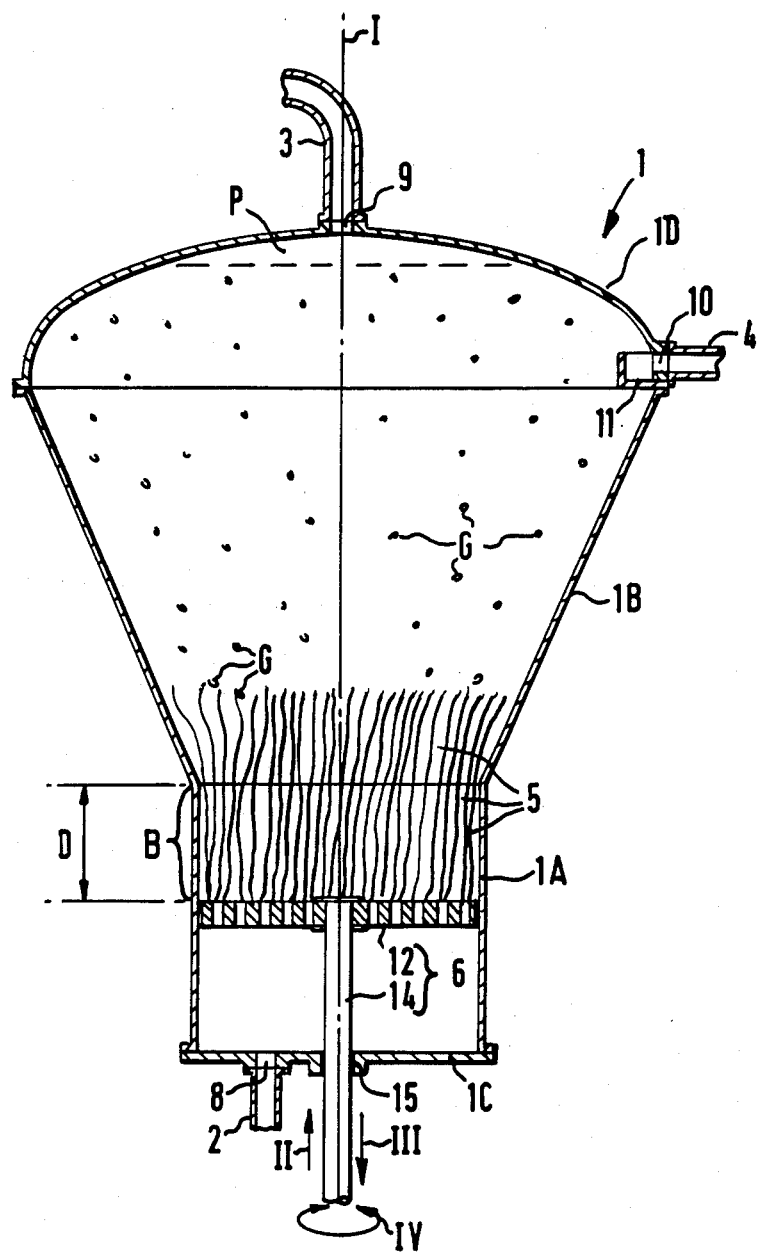

EXPANDABLE FIBROUS BED COALESCER

BACKGROUND OF THE INVENTION

The invention relates to an apparatus for the treatment of liquids, such as for coalescing liquid droplets that are dispersed in an emulsion. The invention relates in particular to a fibrous bed coalescer which is a permeable bed of fibers.

Fibrous bed coalescers are commonly used in the oil and gas industry for coalescing oil droplets which are dispersed in an oil-in-water emulsion. Reference may be had to U.S. Pat. No. 3,810,832, West German Pat. No. 2,923,779, Soviet Union Pat. Nos. 567,463 and 816,497, and British Pat. No. 2,018,610. The coalescer of the British patent comprises a layer of fibers held under pressure between a pair of perforated plates. The plates are arranged at an adjustable mutual distance and in a lateral sense with respect to the flow path of the fluid to be treated, thereby creating a fibrous bed with an adjustable density and permeability. Although the performance of the known fibrous bed coalescer is satisfactory, it appeared that there were a number of potential high-shear zones where re-dispersion of coalesced droplets could occur. One such zone occurs in the area of the downstream plate where the coalesced droplets travel through the perforations in the plates at high speed. Another problem envisaged with the known apparatus is that the layer of fibers must frequently be cleaned because during operation solid contaminants present in the liquid may agglomerate in the narrow fluid channels between the fibers, thereby clogging the fibrous bed and reducing the coalescence efficiency.

SUMMARY OF THE INVENTION

The invention aims to provide an apparatus which requires less frequent cleaning of the fibers than the known apparatus. The invention aims moreover to provide an apparatus in which the occurrence of high-shear zones near the downstream end of the fibrous bed is avoided.

In accordance with the invention these objectives are accomplished by an apparatus including a housing forming a fluid passage between a fluid feed and a fluid exhaust, and a cluster of fibers arranged in the housing, the housing comprising a neck portion connected to the fluid feed and another portion having a larger width than the neck portion connected to the fluid exhaust, the cluster of fibers being movable relative to the housing from a position in which at least part of the cluster is compressed between the walls of the neck portion into the said other portion and vice versa.

BRIEF DESCRIPTION OF THE DRAWING

The invention may be carried into practice in a number of ways but one specific embodiment will now be described by way of example with reference to the accompanying drawing, in which a longitudinal cross section of an apparatus according to the invention is shown.

DESCRIPTION OF A PREFERRED EMBODIMENT

The apparatus shown in the drawing comprises a housing 1 forming a fluid passage between a fluid feed pipe 2 and a pair of fluid exhaust pipes 3 and 4, and a cluster of fibers 5 being movably arranged in the housing 1 by means of a support 6.

The housing 1 comprises a tubular neck portion 1A and a frustoconical portion 1B having a larger width than the neck portion 1A. The housing portions 1A and 1B have a common central axis I, which is preferably oriented in a substantially vertical sense. The neck portion 1A leads into the frustoconical portion 1B thereby creating a fluid passage with a gradually increasing diameter in the downstream direction. The housing 1 further comprises a lower end cap 1C which is securely sealed to the lower end of the neck portion 1A, and a dome-shaped upper end cap 1D which is securely sealed on top of the frustoconical portion 1B.

The fluid feed pipe 2 leads into the interior of the housing 1 via an inlet port 8 in the lower end cap, whereas the fluid exhaust pipes 3 and 4 are in communication with the housing interior via a first and a second exhaust port 9 and 10, respectively, in the upper end cap 1D. The first exhaust port 9 is arranged near the top of the cap 1D and is intended to be used for the discharge of the coalesced droplets. The second exhaust port 10 is located at a lower level than the first exhaust port 9 and is intended for the discharge of the carrier liquid. The second exhaust port 10 is provided with a trough-shaped inflow chamber 11 in order to avoid the possibility that coalesced droplets flow into the fluid exhaust pipe 4.

It is observed that the apparatus in the position shown is suitable for separating coalesced droplets having a lower specific gravity than the carrier liquid, as is the case in an oil-in-water emulsion. It will be appreciated that if the specific gravity of the liquid droplets to be coalesced is higher than that of the carrier liquid the apparatus should be turned upside down.

The fibers 5 are secured to a disc-shaped perforated plate 12 forming part of the support 6. The plate 12 is arranged orthogonal to the central axis I and the diameter of the plate 12 is slightly shorter than the internal diameter of the tubular neck portion 1A. The plate 12 is mounted on top of a coaxial support rod 14. The support rod 14 passes through an opening 15 in the lower end cap 1C, thereby sealing off the opening 15. The support rod 14 is connected to an actuator mechanism (not shown) located outside the housing 1, which mechanism is suitable to displace the rod 14 upwards (see arrow II) and downwards (see arrow III) in axial direction relative to the housing and to rotate the rod 14 about the central axis I (see arrow IV). The axial stroke of the mechanism is sufficiently long to enable the rod 14 to displace the perforated plate 12 through the interior of the housing 1 from a position in which the plate 12 is located in the neck portion 1A just above the lower end cap 1C to a position in which the plate 12 is located in the frustoconical portion 1B of the housing.

During operation of the coalescer the emulsion of the carrier liquid and finely dispersed droplets enters via the fluid feed pipe 2 and the inlet port 8 into the interior of the housing 1. Subsequently the emulsion stream flows in an upward direction via the perforations of the plate 12 into the cluster of fibers 5.

In the illustrated example the cluster of fibers 5 is kept by means of the support 6 in such a position that at the lower part of the cluster, the fibers are compressed between the walls of the tubular neck portion 1A thereby forming in the neck portion a packed fibrous bed B with a depth D, measured in axial direction.

Coalescence of the finely dispersed liquid droplets occurs in the packed fibrous bed B by interception of the droplets in the narrow fluid channels between the packed fibers 5, which interception enables their agglomeration into larger droplets or globules G.

In the upper part of the cluster of fibers 5, located in the frustoconical housing portion 1B, the fluid channels between the fibers are wider than in the fibrous bed B. As in these wide channels no agglomeration takes place, no further coalescence of the globules G occurs in this part of the cluster of fibers 5.

After having passed the cluster of fibers 5 the emulsion stream containing the coalesced liquid globules G flows upwards with a gradually decreasing velocity through the frustoconical housing portion 1B, thus enabling the globules G to settle out of the emulsion stream under the influence of gravity.

Then in the dome-shaped upper end cap 1D the coalesced globules G agglomerate to a continuous liquid phase P segregated from the carrier liquid, which phase P is drained from the housing via the first fluid exhaust port 9 into the fluid exhaust pipe 3. The carrier liquid is drained from the housing 1 via the second exhaust port 10 into the other fluid exhaust pipe 4.

The emulsion stream may contain solid debris which will accumulate in the packed fibrous bed B. Such accumulation of solid debris may influence the coalescence performance of the bed B in a negative manner, causing the backpressure to rise until eventually the bed must be cleaned. This occurrence will be less frequent than with the previous design of coalescer since in the present invention all of the fibers are not in the compressed part of the bed.

For cleaning of the bed, the operation of the coalescer is stopped and the contaminated cluster of fibers 5 is cleaned by first moving the cluster into the frustoconical housing portion and then washing away the solid debris by means of a cleaning liquid flowing at high speed upwards through the housing 1. During the cleaning procedure the rod 14 may be rotated either continuously or alternatingly in opposite directions (see arrow IV) so as to allow centrifugal forces to sweep the debris away from the fibers 5. After the cleaning procedure another coalescence cycle may begin.

The fibers used in the apparatus according to the invention may be made of any suitable material, such as glass or polypropylene. The fibers may be treated with N-($\beta$-aminoethyl)-$\gamma$-aminopropyltrimethoxy-silane to provide the fibers at least at the surface thereof with a suitable electrical charge. A suitable treatment of this kind is described in detail in applicants copending British patent application No. 8304389.

It will be appreciated that the fibers may be secured to the perforated plate which may be a sieve plate in any suitable manner, such as by knitting, bonding, etc. Additionally, instead of securing the fibers to a perforated plate the fibers may be secured to an eye on top of the rod.

What is claimed is:

1. Apparatus for treating liquids comprising a housing forming a fluid passage between a fluid feed and a fluid exhaust, and a cluster of fibers arranged in the housing, the housing having a neck portion connected to the fluid feed and another portion having a larger width than the neck portion connected to the fluid exhaust, both housing portions having a common central axis, the cluster of fibers being secured to a support which is displaceable axially relative to the housing and which is operable to be rotated about the central axis.

2. The apparatus of claim 1, wherein the neck portion has a tubular shape and said other portion is frustoconical.

3. The apparatus of claim 2, wherein the support can be displaced stepwise in axial direction between a position in which the cluster of fibers is substantially located in the neck portion of the housing and a position in which the cluster of fibers is substantially located in the frustoconical portion of the housing.

4. The apparatus as claimed in claim 3, wherein the support comprises a rod, the rod extending in a substantially axial direction through the interior of the housing and passing through an opening in the housing wall, thereby sealing off the opening.

5. The apparatus of claim 4, wherein the support further includes a perforated plate, the fibers being secured to the plate.

6. The apparatus of claim 4, wherein the support further includes an eye which is secured to an end of the rod, the fibers passing through the eye and being connected thereto.

7. The apparatus as claimed in claim 1, wherein the fibers are made of polypropylene.

8. The apparatus of claim 7, wherein the fibers have at least at the surface thereof an electrical charge.

* * * * *